Jan. 2, 1968   W. C. SEALEY ET AL   3,362,000
MEANS FOR INCREASING THE INDUCTANCE OF SHUNT REACTORS
Filed May 31, 1966   3 Sheets-Sheet 2

Inventors
William C. Sealey
Michael W. Waterman
By Lee H. Kaiser
Attorney

United States Patent Office 3,362,000
Patented Jan. 2, 1968

3,362,000
MEANS FOR INCREASING THE INDUCTANCE
OF SHUNT REACTORS
William C. Sealey, Wauwatosa, and Michael W. Waterman, Milwaukee, Wis., assignors to Allis-Chalmers Manufacturing Company, Milwaukee, Wis.
Filed May 31, 1966, Ser. No. 553,844
7 Claims. (Cl. 336—58)

This invention relates generally to means for increasing the inductance of shunt reactors and the like equipment.

This application is a continuation-in-part of our application Ser. No. 434,752, now abandoned, filed Feb. 24, 1965, and having the same title and assignee as the present invention.

Shunt reactors are used with power transmission lines to neutralize capacitive current to ground and, in the event of opening of the lines, to allow the charge remaining on the line to bleed to ground. Usually, the shunt reactor has an air or nonmagnetic material core or a laminated steel core with air gaps within the coil and the assembly is immersed in oil inside a tank. These coils must be either mounted in nonmagnetic tanks or provided with magnetic end shielding to limit the stray flux produced during normal operation, thereby limiting or eliminating excessive heating of the case walls or magnetic stresses which may cause physical damage to the case structure.

Disadvantages, problems and inherent factors to be considered in reactor design are as follows. Any air core coil in free space or with magnetic shield material placed at a considerable distance from the coils has magnetic flux with a considerable component in a radial direction at the coil ends. To avoid excessive eddy currents in this region, the conductor must be subdivided and transposed in the axial direction in addition to the subdivision and transposition in the radial direction which reactors normally have. A conventional air core reactor is wound with individually insulated strands of round conductor to reduce the eddy current loss and prevent excessive heating, and the conductor dimensions must be small in all directions because both the axial and radical components of the flux are large in some locations within the coil. The space factor of round conductors wound into round cables in known air core reactors is very poor and is generally less than 75 percent, and when wound in layers spaced by ducts, this value is multiplied by the factor 0.7854, resulting in a shape space factor of only 0.75 times 0.7854 or approximately 0.59.

Shields which have been used to prevent heating in the enclosing structure or tank have been placed at a considerable distance from the coil and increased the inductance of the coil less than 10 percent.

The reactant of a coil can be increased by using an iron core with spaced gaps inside the coil. In low voltage reactors the iron core fills a substantial portion of the space available within the coil and the increase in reactance is considerable. For high voltage reactors, however, the clearance space needed between the coil and its interior iron core is so large that only a small amount of space is available for the iron core. Consequently, the reactance gained by the use of iron in the center of the coil makes this construction less advantageous for high voltage reactors. The iron core must be constructed with gaps to provide linear characteristics for the reactor and prevent saturation of the iron, thereby requiring the use of a large number of small laminations which makes construction complicated and expensive, particularly in large kva. sizes. The relatively small laminations of such an iron core are difficult to hold in place mechanically, and it is difficult to cool the iron core disposed within the coil. Vibration and noise at the gaps of the iron core must be reduced to acceptable values, and further the gaps must be kept small to reduce the amount of fringing flux cutting the coil. Still further, the coil conductor of an iron core reactor must be subdivided in the axial direction to reduce the eddy current loss resulting from the radial component of the flux caused by the air gaps in the core. An iron core reactor must be longer than desirable in the coil axial direction to provide sufficient iron for mechanical support of the lamination packets on each side of the air gaps in the core.

An increase in reactance also can be achieved by using shorter, flatter coils. However, in flat coils some of the flux through the air core and through portions of the coils contiguous to the air core is parallel to the axial dimension of the coil for only a short distance and has a substantial radial component for substantial distances near the ends of the coil. This flux intersects the ends of the coils and, if the current is heavy, eddy current losses in the conductors are a severe problem. It is difficult to subdivide the conductor sufficiently so as to secure low eddy current losses for fluxes in both directions unless stranded cable with insulated strands is used. This is an uneconomical type of construction for high voltage applications and the space requirements are large even for low voltage coils submerged in oil. However, such coils have been wound with stranded copper conductors. When such coils are placed under oil, iron shielding is provided to prevent the tank from overheating due to eddy currents. Formerly, the iron shielding has been placed remote from the coils in order to secure proper insulation distances and so that the iron will not increase the reactance substantially over the air core reactance.

It is an object of the present invention to provide improved shunt reactors which have a maximum amount of inductance with a minimum amount of active material.

Another object is to provide improved shunt reactors having an increased kva. rating for the coils and characterized by decreased eddy current losses.

Another object is to provide shunt reactors of the aforesaid character for high voltage application which are substantially more compact, lighter and less costly than those heretofore known.

Another object is to provide shunt reactors of the aforesaid character which use a short coil but wherein the flux lines are axial instead of having a substantial radial component and wherein the average length of the magnetic flux path in air is substantially reduced below the natural value for a coil of an air core reactor.

Another object of the invention is to provide an improved shunt reactor whose magnetic circuit is external to the current carrying coil and whose internal magnetic field is parallel to the coil axis, thereby reducing the cross flux through the coil conductors to a negligible value. A further object is to provide such a reactor which permits the use of wide conductor of small thickness that results in low eddy current loss and a high space factor. Still another object is to provide such a reactor having an inductance several times that of an equivalent air core reactor of the same physical size. A further object is to provide such a reactor which eliminates the mechanical and heating problems associated with an iron core reactor having air gaps and to provide such an improved reactor having a lower noise level than known structures.

Another object is to provide a reactor wherein practically all of the reluctance in the flux path is within the coil and the coil has a reduced axial length which further shortens the length of air path for the magnetic flux and thus results in maximum inductance.

Other objects and advantages of the invention will hereinafter appear.

A reactor in accordance with the invention has an axially short coil and magnetically permeable yoke means adjacent the axial ends of the coil which straighten the magnetic flux lines within the coil and decrease the length of the average flux path, in comparison to known reactors, so that substantially all of the reluctance of the magnetic path is internal of the coil. The short axial coil length further reduces the length of the flux path in air and contributes to the increase in inductance. The magnetically permeable yoke means in combination with the axially short coil provide an internal field parallel to the coil axis and reduce the cross flux to a negligible value, thereby permitting use of a wide, thin conductor which provides low eddy current losses and a high space factor in comparison to known reactors. In a preferred embodiment of the invention, the coils are arranged in two parallel groups and the high voltage line lead is connected to a junction between the two groups and the ground lead is connected adjacent the axial ends of the coils, thereby reducing the potential between the magnetic yoke and the axial ends of the coils and permitting the magnetically permeable yoke to be closer to the coils and to be more effective in preventing deviation of the magnetic flux lines from the axial direction.

The accompanying drawings illustrate preferred embodiments of the invention, but it is to be understood that the embodiments illustrated are susceptible of modifications with respect to details thereof without departing from the scope of the appended claims.

Figure 1:
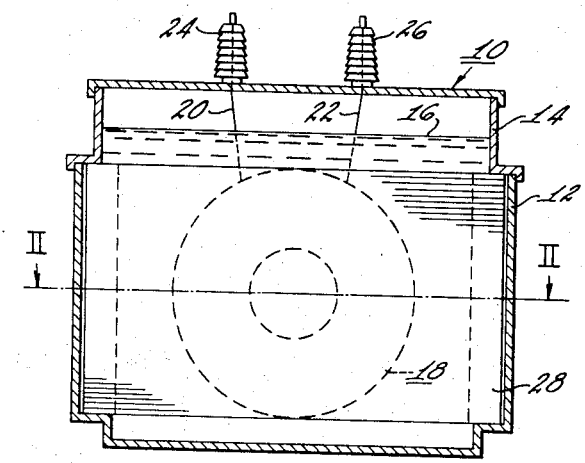
FIG. 1 is a side elevational view of a single phase shunt reactor incorporating the present invention.
Figure 2:
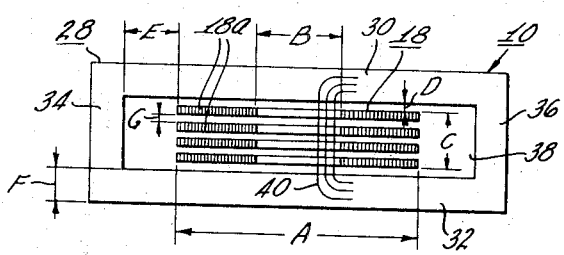
FIG. 2 is a cross sectional view taken along line II—II of FIG. 1.
Figure 8:
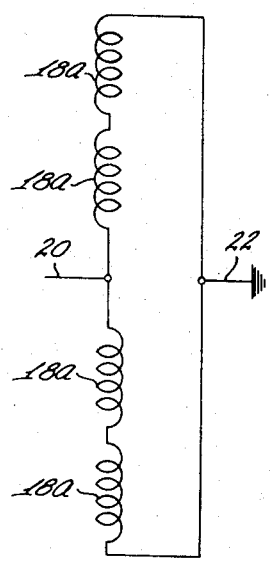
FIG. 8 is a diagrammatic showing of electrical connections for the reactor of FIGS. 1 and 2.

Referring to FIGS. 1 and 2, the numeral 10 designates a shunt reactor incorporating the present invention. It is to be understood that one such reactor 10 may be used in each phase of a multiphase high voltage electrical transmission system and that the system is rated, for example, at 500 kv. or above and is sometimes referred to as an extra high voltage system, abbreviated EHV. Reactor 10 comprises a tank 12 having a suitable cover 14 and is filled with a dielectric media, such as oil, to a level designated 16. Within tank 12 and submerged in the oil is a reactor coil 18 which is understood to be rigidly supported therein. Coil 18 has a nonmagnetic core which may have a circular cross section as shown, or the cross section may be rectangular or any other configuration. Coil 18 comprises a plurality of electrically connected flat windings, or pancake windings 18a and in an actual embodiment would comprise about 80 such windings 18a. Each winding 18a is wound from a continuous copper strip, with each turn suitably spaced and insulated from the next. In practice, a copper strip .05 inch thick and .25 wide can be employed, i.e., five times wider in the axial direction than in the radial direction. The space factor of such a flat strip conductor is approximately 70 percent greater than that of a typical conductor used in known reactors and consequently 70 percent more turns can be placed in a coil. Coil 18 terminates in two conductor leads 20 and 22 which are led out of tank 12 through suitable bushings 24 and 26, respectively, mounted on cover 14 of reactor 10. In practice in high voltage shunt reactors, pancake windings 18a are arranged in two groups with the windings in each group connected in series with each other and the two groups being in parallel with each other. Thus, as FIG. 8 shows, of the two conductor leads 20 and 22, lead 20 from the high voltage line is connected to the center of the stack of the pancake windings 18a and lead 22 is connected to the ends of the two groups near the yoke and then to ground. The windings 18a in the two groups are wound in opposite directions so that flux in all portions of the coil is in the same direction. Reactor 10 further comprises a magnetically permeable outer core or yoke 28 which is rigidly mounted and supported by tank 12 and preferably surrounds coil 18. Magnetic core 28 comprises two side legs 30 and 32 and two end legs 34 and 36 and has a central opening or window 38 within which coil 18 is located. Core 28 is made of laminated iron with the planar surfaces of the laminations parallel to the axis of coil 18. The height of core 28 is preferably at least as great as the diameter of coil 18 so as to completely surround the latter.

For convenience in discussion coil 18 is designated in FIG. 2 as having an outside diameter A; an inside diameter B; and a thickness C in the axial direction. Coil 18 is considered to be a flat or short coil in the reactor art because thickness C is small as regards outside diameter A. Actually, any coil wherein dimension C is equal to or less than twice dimension A is a short coil within the meaning of the present invention. Another way of stating this is that the axial dimension C is equal to or less than four times the coil radius, or, in the inverse, that the ratio of coil radius to coil axial length is greater than 0.25. Dimension B, the inside diameter, is not ciritcal as regards the present invention and is dictated by other factors. In an actual embodiment dimensions A, B and C were about 40, 20 and 30 inches, respectively, and dimension F, the thickness of iron core 28 was about 6 inces. Each side leg 30 or 32 of core 28 is spaced a distance D from the end of coil 18. The improved results of the invention are obtained when the distance D between magnetically permeable yoke 28 and coil 18 is less than twice G, where G is the space between adjacent windings 18a in coil 18. Ideally the yoke-to-coil distance D should equal approximately ½ G, but it has been found that the eddy current loss is not excessive if the distance D is not greater than twice G and the coil conductor is not too wide in the axial direction.

When coil 18 is energized, a magnetic field is generated around the coil with lines of magnetic flux designated 40 passing through the opening or air core in the coil in an axial direction. With coil 18 and core 28 arranged as shown in FIG. 2 and described above the lines of flux 40 in the air core are straightened out, resulting in a shortened flux path in the air core, and the flux lines do not have a substantial radial component to produce eddy currents. As a result, the inductance of reactor 10 is substantially greater than would be the case if core 28 were not employed or were spaced farther from the coil. In the absence of core 28, or if the core were spaced relatively far from the coil, the lines of flux in the air core would tend to be curved as are the lines of flux designated 44 in a prior art reactor 41 shown in FIG. 3. As a result, the lines of flux 44 would intersect the windings of coil 18 near its ends at an angle which would result in serious eddy currents in the coil and effect a power loss. If the coil has a predetermined inductance when energized in free air, its inductance can be increased by 200 or 300 percent in accordance with the present invention. Inductance remains constant even as current flow is increased to maximum working value. If 70 percent more turns are placed in the coil as a result of improved space factor and the coil is placed in a magnetically permeable yoke 28 to obtain 2.5 times the inductance of a similar air core coil, the KVAR rating of the coil will be $(1.7)^2$ times 2.5 or 7.2 times its KVAR rating as an air coil.

It is to be understood that, while coil 18 of reactor 10 is shown and described as comprising a plurality of flat or pancake windings with each winding comprising a copper conductor strip, other types of coils could be employed. For example, a coil could comprise two windings, one in axial alignment with the other, with each winding being sheet wound from a length of conductive material about .050 inch thick and about 15 inches wide. Thus, the conductor is approximately 300 times wider in the axial direction than in the radial direction.

Figure 3:
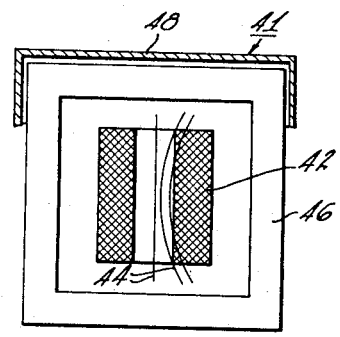
FIG. 3 is a cross sectional view of a prior art single phase reactor.

FIG. 3 shows a prior art reactor 41 of the type required to provide the same inductance as reactor 10. Reactor 41 comprises a long coil 42 which is necessary to overcome the effect of the eddy currents caused by intersection of the curved lines of flux 44 with the ends of the coil. Iron core 46 of reactor 41 surrounds coil 42 to shield stray magnetic flux which might otherwise react with the metal walls of tank 48 surrounding the coil and produce eddy currents and heat in the tank. Iron core 46 is not sufficiently close to coil 42 to substantially affect the inductance of the coil.

The magnetically permeable yoke means 28 straighten the flux lines within the coil 18 and decrease the length of the average flux path so that substantially all of the reluctance of the magnetic flux path is internal of the coil. The coil arrangement shown in FIG. 8 permits the axial ends of the coil, which are electrically connected to ground lead 22, to be close to the magnetic yoke, thereby further straightening the magnetic flux lines and decreasing the length of the average flux path. Still further, the axially short coil 18 decreases the length of the nonmagnetic portion of the magnetic flux path and results in further increase in inductance.

A formula commonly used for calculating the inductance of an air core reactor is:

$$L_a = \frac{N^2 a^2 10^{-7} F}{b + c + R}$$

where N is the number of turns per coil between terminals, $a$ is the mean radius of the coil, R is the outside radius of the coil, $c$ is the radial thickness of the coil, $b$ is the coil height in the axial direction (shown as C in FIG. 2), $r$ is the inside radius of the coil, and F is a correction factor depending on the coil proportions, a typical value being 1.1.

A formula which may be used for calculating the inductance of a coreless iron reactor in accordance with the invention is:

$$L_c = \frac{1.005 N^2 (r^2 + .667rc + .167c^2) \times 10^{-7}}{b_1}$$

where $b_1$ is the opening, or window height, in the magnetically permeable yoke 28 axial of the coil.

The ratio of inductances $$\frac{L_c}{L_a} = \left(\frac{r^2 + .667rc + .167c^2}{r^2 + rc + .25c^2}\right)\left(\frac{b + c + R}{b_1}\right)\left(\frac{1}{F}\right)$$

Examination of this formula reveals that the first and third terms in parentheses on the right hand side of the equation are each aproximately equal to unity and that the increase in coil inductance due to the magnetically permeable yoke results from decrease in the average length of flux path since $(b+c+R)$ is always greater than $b_1$ for a commercial reactor. The value of the fraction $b/b_1$ (coil height/yoke window height) is slightly less than one, and consequently it will be appreciated that increase in the coil radial thickness $c$ and in the outside coil radius R in relation to coil height $b$ (thereby making the coil axially short), results in increase in inductance in comparison to an air core reactor.

Figure 11:
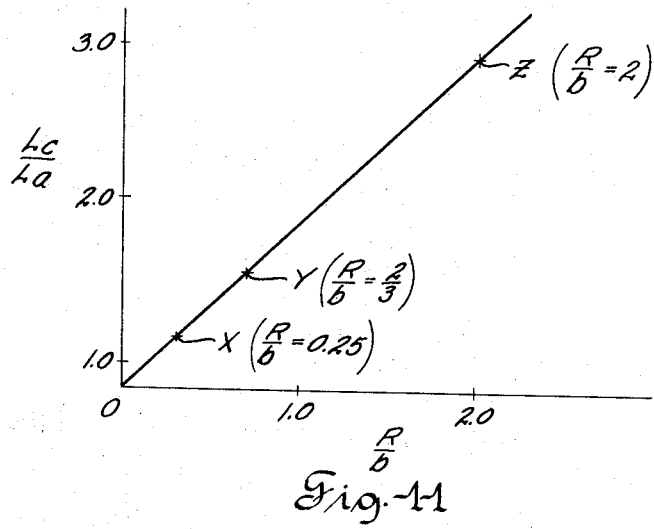
FIG. 11 is a graph plotting the ratio of inductance of a reactor embodying the invention to inductance of air core reactor, $L_c/L_a$, against the ratio of coil radius to coil axial length, $R/b$.

FIG. 11 is a graph plotting the ratio of inductances $L_c/L_a$ against the ratio of coil outside radius/coil axial height, i.e., against $R/b$, and shows that a coreless iron reactor in accordance with the invention having a coil whose axial length is twice its diameter, i.e., $R/b=0.25$ at point $x$ on the curve of FIG. 11, will theoretically result in an increase in inductance of approximately 14 percent in comparison to a similar prior art reactor having an air core; that the reactor of FIG. 2 described as having an outer diameter of 40 inches and a coil height of 30 inches ($R/b=\frac{2}{3}$ at point $y$ on the curve) will result in an increase of inductance of aproximately 57 percent in comparison to a similar prior art reactor having an air core; and that a reactor in accordance with the invention having a coil whose axial length is equal to one-fourth of its diameter ($R/b$ equals 2 at point $z$ on the curve) will result in an increase in inductance of aproximately 290 percent in comparison to a similar prior art reactor having an air core.

Known air core reactors are wound with individually insulated strands of round conductor to reduce eddy current loss and prevent excessive heating, and the conductor dimensions must be small in all directions because both the axial and radial components of the flux are large in some locations within the coil. The space factor of round conductors wound into round cables of such prior art air core reactors is very poor and is generally less than 75 percent, and when wound in layers spaced by ducts this value is multiplied by .7854 and results in the poor shape space factor of 0.75 times 0.7854 or approximately 0.59. Inasmuch as the flux lines of the reactor of the invention are parallel to the axis, subdivision of the conductor in the axial direction is not required and each pancake winding 18a is wound of conductor of rectagular cross section having a width several times its thickness. If the same coil dimensions are used for a known air core reactor and a reactor in accordance with the invention and the same conductor cross section is used but the number of turns varied, the reactor embodying the invention would have an inductance of approximately $$\left(\frac{1}{0.59}\right)^2$$

or approximately 287 percent of the inductance of the air core reactor as a result of improvement of the space factor only. Further the inductance of a reactor embodying the invention would also be theoretically increased by a factor of approximately 2.5 as a result of the increase of the magnetic flux density linking the turns of the coil, and consequently the reactor embodying the invention would have an inductance approximately 2.5 times 2.87 equals 7.2 times greater than that of a known air core reactor having the same coil dimensions.

The reactor of the invention results in substantial reduction in size and weight in comparison to known structures. In a recent sealed bid for reactors of 33,333 k.v.a., 500 kilovolt shunt reactors in which five bids were submitted, the actual weight of the reactor embodying the invention was approximately 64 percent of the lowest weight of the other four reactors and 43 percent of the highest weight of the other four reactors.

A shunt reactor embodying the invention eliminates the gapped iron core disposed interior of the coil of known iron core reactors and eliminates the problems of cooling the iron core disposed within the coil; of holding the individual laminations of the gapped iron core in place mechanically; of reducing vibration and noise at the gaps of the iron core to acceptable values; of reducing the fringing flux from the gaps which cut the coil; and of subdividing the iron core in an axial direction to reduce eddy loss due to the radial component of flux caused by gaps in the iron core disposed within the coil. Subdivision of the coil conductor in the radial direction is easily accomplished in a reactor embodying the invention because the flux has a negligible radial component. The weight and size of known iron core reactors are substantially greater than a reactor embodying the invention because the iron core must be longer than desirable in an axial direction to provide sufficient iron for mechanical support of the laminations at the air gaps and because of the insulation clearance required between the coil and the iron core which reduces the size of the iron core and increases the coil size of known iron core reactors.

The following table compares the weight of a typical iron core shunt reactor with that of a reactor embodying the invention:

|  | Iron Core Reactor, lbs. | Reactor of Invention, lbs. |
| --- | --- | --- |
| Core and coils | 90,000 | 46,900 |
| Case | 48,000 | 38,900 |
| Oil | 66,000 | 33,200 |
| Total | 204,000 | 119,000 |

Figure 4:
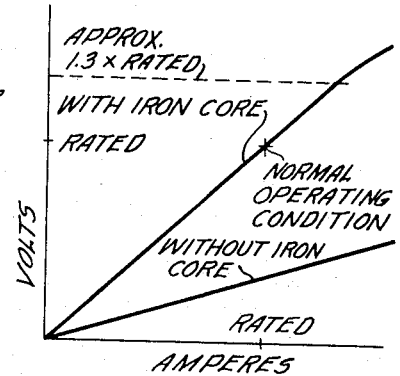
FIG. 4 is a graph showing the performance characterisitcs of the reactor incorporating the present invention.

FIG. 4 is a graph comparing the typical performance characteristics of a reactor in accordance with the invention such as reactor 10 and the coil used therein operated without the iron core 28. The graph plotting voltage against current shows that reactor 10 provides a desirable characteristic at normal and greater than normal operating ranges. To obtain this characteristic, the iron magnetic circuit is of sufficient cross section to avoid saturation over the desired range of current.

Figure 5:
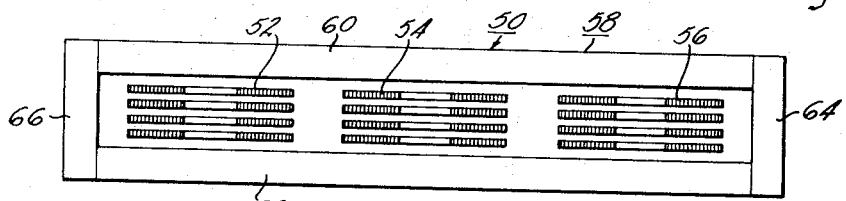
FIG. 5 is a cross sectional view of a multiphase shunt reactor incorporating the present invention.

FIG. 5 shows a multiphase shunt reactor 50 incorporating the present invention. Reactor 50 comprises three coils 52, 54 and 56, one for each phase of a three phase electrical system. Each coil 52, 54 and 56 is understood to be similar in all respects to coil 18 in reactor 10 hereinbefore described. The coils 52, 54 and 56 are surrounded by an iron core 58 which cooperates with each coil to straighten the flux lines and shorten the flux path in the air core of each coil. In accordance with the invention, the coils 52, 54 and 56 have an axial length less than twice their diameter (or stated in other words, a ratio of coil radius to coil axial length $R/b$ greater than 0.25), the sides 60 and 62 of core 58 are as close as practical to the ends of the coils 52, 54 and 56.

Core 58 is shown as comprising end pieces 64 and 66 as part of its magnetic circuit. It is to be understood, however, that the end pieces 64 and 66 could be deleted and nonmagnetic support means substituted therefor since the return paths for the flux lines between the core sides 60 and 62 could be through the coils 52, 54 and 56.

Figure 6:
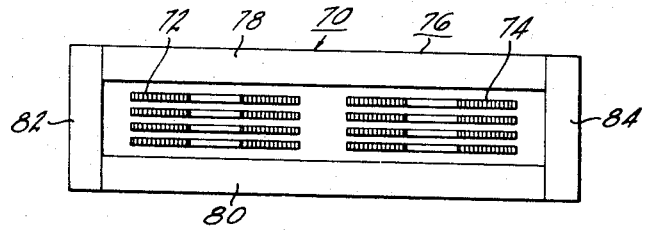
FIG. 6 is a cross sectional view of a single phase shunt reactor employing two coils and incorporating the present invention.
Figure 9:
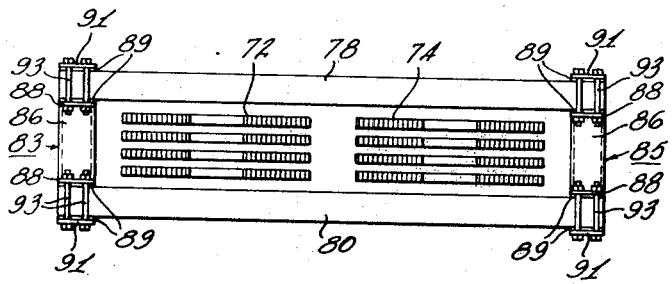
FIG. 9 shows an alternative form of the embodiment of FIG. 6 wherein support means are substituted for the end legs of the magnetic core.
Figure 10:
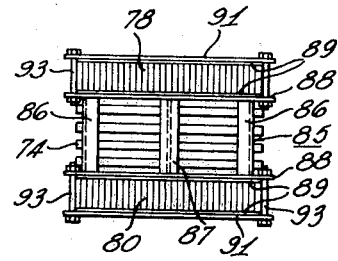
FIG. 10 is an end view of the reactor of FIG. 9.

FIG. 6 shows an alternative embodiment of a single phase shunt reactor 70 incorporating the present invention. Reactor 70 is shown as comprising two coils 72 and 74 and an iron core 76 but is understood to be adapted to use in a single phase line of a multiphase system. Each coil 72 and 74 is understood to be similar in all respects to the coil 18 in reactor 10 hereinbefore described and the cores 76 cooperates with each coil to straighten and shorten the flux path in the air core of each coil. In accordance with the invention, the coils 72 and 74 are short axially and have an axial length less than twice their diameter and the sides 78 and 80 of core 76 are as close as practical to the ends of the coils 72 and 74. Core 76 includes end pieces 82 and 84 which could be deleted, and FIGS. 9 and 10 illustrate an embodiment wherein support means 83 and 85 are substituted for the magnetically permeable end pieces 82 and 84 of the FIG. 6 embodiment. The support means must be capable of withstanding the magnetic forces of attraction between core sides 78 and 80, and each support means 83 and 85 may include a pair of channel members 86 and a vertical member 87 of I-shaped cross section extending parallel to the axis of coils 72 and 74 and secured at their ends to clamping plates 88 disposed transverse to and against the inner surfaces of the laminated core sides 78 and 80 with sheet insulation 89 positioned therebetween. Similar clamping plates 91 may be disposed against the outer surfaces of core sides 78 and 80 with sheet insulation 89 therebetween, and suitable connecting means such as bolts 93 may clamp plates 88 and 91 on opposite sides of core legs 78 and 80. The support means 83 and 85 may be "non-magnetic" in the sense that their permeability is substantially lower than that of the core legs 82 and 84 of the FIG. 6 embodiment, but it will be appreciated that structural iron members may be utilized for the channel members 86 and the I-shaped cross section member 87 and that steel may be utilized for the clamping plates 88 and 91.

Figure 7:
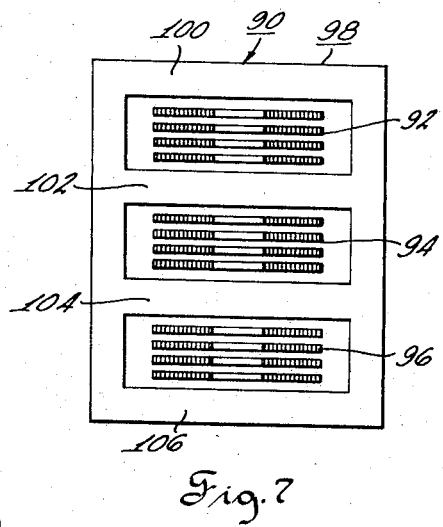
FIG. 7 is a cross sectional view of another embodiment of a multiphase shunt reactor incorporating the present invention.

FIG. 7 shows a multiphase shunt reactor 90 incorporating the present invention. Reactor 90 comprises three coils 92, 94 and 96, one for each phase of a three phase electrical system, which are arranged in axial alignment. Each coil 92, 94 and 96 is understood to be an axially short coil having a ratio of coil radius to coil axial length, i.e., $R/b$, greater than 0.25 and to be similar in all respects to coil 18 in reactor 10 hereinbefore described. The coils 92, 94 and 96 are surrounded by an iron core 98 which cooperates with each coil to straighten and shorten the flux path in the air core of each coil. The portions 100, 102, 104 and 106 of core 98 are as close as practical to the adjacent ends of the axially short coils 92, 94 and 96.

The embodiments of the invention in which an exclusive property or privilege is claimed are defined as follows:

1. A high voltage reactor comprising, in combination, a casing, a cooling and insulating dielectric liquid within said casing, an annular coil immersed in said dielectric liquid within said casing and having its axis horizontal and an axially extending nonmagnetic core, laminated magnetically permeable yoke means immersed in said dielectric liquid within said casing and having side portions near the axial ends of said coil and end portions parallel to the axis of said coil connecting said side portions for completing a closed magnetically permeable path for magnetic flux in surrounding relation to said coil and for decreasing the length of average flux path so that substantially all of the reluctance of the magnetic flux path is internal of said coil, said yoke means having laminations in planes parallel to the axis of said coil, said coil having an axial length less than twice its diameter and comprising two coil groups electrically connected in parallel and wound in opposite directions and having the high voltage lead and ground lead connected at the junctions between said coil groups, each said coil group comprising a plurality of series connected, axially aligned and spaced apart pancake windings having a horizontal axis and permitting circulation of said dielectric liquid vertically between said pancake windings and each said pancake winding being wound of rectangular strip conductor having a substantially greater dimension in the axial direction than in the radial direction, the pancake windings in said two coil groups connected to said ground lead being positioned near said yoke means and the pancake windings in said two coil groups connected to said high voltage lead being disposed adjacent the center of said coil, the axial spacing between adjacent pancake windings being approximately uniform and said magnetically permeable yoke means being spaced a distance from the pancake windings at the axial ends of said coil no greater than twice the axial spacing between adjacent pancake windings.

2. The combination of claim 1 wherein said coil has an axial length less than its diameter.

3. The combination of claim 1 and including a plurality of coils spaced apart radially in the same horizontal plane and wherein said side portions of said yoke means are near the axial ends of all of said coils.

4. The combination of claim 1 and including a plurality of axially spaced apart coils in the same horizontal plane and wherein said side portions of said yoke means are disposed near the axial ends of all of said coils and at least one such yoke means side portion is disposed between two of said axially spaced apart coils and is common to the magnetic flux path of said two coils.

5. A shunt reactor in accordance with claim 1 having a voltage rating of at least 200 kilovolts and wherein said coil has a ratio of coil radius to coil height greater than 0.25, whereby the inductance of said reactor is greater than 110 percent of that of a similar air core reactor.

6. A reactor in accordance with claim 5 wherein said ratio of coil radius to coil height is greater than 0.50.

7. A reactor in accordance with claim 6 wherein said strip conductor has a width in the axial direction equal to at least five times its thickness in the radial direction.

References Cited

UNITED STATES PATENTS 3,160,839   12/1964   Bennon et al. _____ 336—65 XR

LARAMIE E. ASKIN, *Primary Examiner.*

LEWIS H. MYERS, *Examiner.*

T. J. KOZMA, *Assistant Examiner.*